(12) United States Patent
Maceiras et al.

(10) Patent No.: US 12,034,726 B1
(45) Date of Patent: Jul. 9, 2024

(54) LOGGING ACCESS TYPES BASED ON INSERTING TENANT CONTROL HEADERS INTO REQUESTS

(71) Applicant: CLOUDFLARE, INC., San Francisco, CA (US)

(72) Inventors: Adrian Mateo Maceiras, Austin, TX (US); Andrew Kenneth Godfrey Martin, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/326,811

(22) Filed: May 31, 2023

(51) Int. Cl.
*H04L 9/40* (2022.01)
*G06Q 30/01* (2023.01)
*H04L 67/56* (2022.01)

(52) U.S. Cl.
CPC ............ *H04L 63/10* (2013.01); *G06Q 30/01* (2013.01); *H04L 67/56* (2022.05)

(58) Field of Classification Search
None
See application file for complete search history.

(56) References Cited

U.S. PATENT DOCUMENTS

| | | | | |
|---|---|---|---|---|
| 8,156,246 B2 * | 4/2012 | Short | ................. | H04L 63/0892 709/239 |
| 8,266,269 B2 * | 9/2012 | Short | ................. | H04L 63/102 709/227 |
| 9,038,108 B2 * | 5/2015 | McCausland | ........... | H04L 67/56 725/47 |
| 9,038,151 B1 * | 5/2015 | Chua | ................. | H04L 47/10 726/1 |
| 9,229,800 B2 * | 1/2016 | Jain | ................. | H04L 43/045 |
| 9,471,775 B1 * | 10/2016 | Wagner | ............... | G06F 9/45533 |
| 9,509,776 B2 * | 11/2016 | Chou | ................. | H04L 67/14 |
| 9,514,327 B2 * | 12/2016 | Ford | ................. | G06Q 50/18 |
| 9,553,860 B2 * | 1/2017 | Meyer | ................. | H04L 63/10 |
| 9,774,495 B1 * | 9/2017 | Okita | ................. | H04L 41/0803 |
| 9,858,559 B2 * | 1/2018 | Raleigh | ................. | G06Q 40/12 |
| 9,880,933 B1 * | 1/2018 | Gupta | ................. | G06F 3/0656 |

(Continued)

OTHER PUBLICATIONS

Cao et al "LogStore: A Cloud-Native and Multi-Tenant Log Database," Industrial Track Paper, SIGMOD'21, Jun. 20-25, 2021, Virtual Event, China, pp. 2464-2476 (Year: 2021).*

(Continued)

*Primary Examiner* — Luu T Pham
*Assistant Examiner* — James J Wilcox
(74) *Attorney, Agent, or Firm* — NICHOLSON DE VOS WEBSTER & ELLIOTT LLP

(57) ABSTRACT

A proxy server receives a first request from a first user to access a resource hosted by a cloud-based server. The proxy server inserts a first tenant control header into the first request specifying a tenant identifier. The tenant identifier indicates a tenant permitted to access the resource. The proxy server then transmits the first request with the inserted first tenant control header to the cloud-based server. In response to receiving a first response indicating a rejection of the first request with the inserted first tenant control header, the proxy server transmits the first request again to the cloud-based server but without the first tenant control header. The proxy server then logs the first request as an access request using a non-permitted tenant identifier.

18 Claims, 5 Drawing Sheets

(56) References Cited

U.S. PATENT DOCUMENTS

| | | | |
|---|---|---|---|
| 9,900,317 B2* | 2/2018 | Cantrill | H04L 63/105 |
| 9,961,011 B2* | 5/2018 | Mordani | G06F 8/60 |
| 10,057,775 B2* | 8/2018 | Raleigh | H04M 15/64 |
| 10,165,447 B2* | 12/2018 | Raleigh | H04M 15/88 |
| 10,205,701 B1* | 2/2019 | Voss | H04L 67/02 |
| 10,305,861 B2* | 5/2019 | Moysi | H04L 63/0281 |
| 10,333,959 B2* | 6/2019 | Katrekar | H04L 63/0272 |
| 10,348,767 B1* | 7/2019 | Lee | H04L 63/0236 |
| 10,367,748 B2* | 7/2019 | Short | H04L 43/00 |
| 10,425,386 B2* | 9/2019 | Wardell | H04L 63/0281 |
| 10,425,443 B2* | 9/2019 | Ronen | H04L 63/1458 |
| 10,630,771 B1* | 4/2020 | Garza | H04L 67/63 |
| 10,708,379 B1* | 7/2020 | Gupta | G06F 11/1471 |
| 10,728,342 B1* | 7/2020 | Lieberman | H04L 67/306 |
| 10,749,943 B1* | 8/2020 | Feiguine | H04L 67/1008 |
| 10,776,441 B1* | 9/2020 | Echeverria | H04L 67/75 |
| 10,798,100 B1* | 10/2020 | Chu | G06F 16/2455 |
| 10,868,836 B1* | 12/2020 | Yancey | H04L 63/0227 |
| 10,909,088 B2* | 2/2021 | Colrain | G06F 16/972 |
| 11,146,569 B1* | 10/2021 | Brooker | G06F 21/335 |
| 11,153,190 B1* | 10/2021 | Mahajan | H04L 67/148 |
| 11,184,403 B1* | 11/2021 | Wu | H04L 67/10 |
| 11,196,551 B2* | 12/2021 | Weldemariam | H04L 9/3247 |
| 11,269,808 B1* | 3/2022 | Yuan | G06F 16/172 |
| 11,269,939 B1* | 3/2022 | Sammer | H04L 67/55 |
| 11,271,972 B1* | 3/2022 | Ravi | H04L 63/0236 |
| 11,271,973 B1* | 3/2022 | Ravi | H04L 63/20 |
| 11,303,647 B1* | 4/2022 | Wu | H04L 63/105 |
| 11,334,388 B2* | 5/2022 | Jakobsson | H04W 4/029 |
| 11,372,654 B1* | 6/2022 | Battle | G06F 16/13 |
| 11,381,537 B1* | 7/2022 | Freed | H04L 51/214 |
| 11,416,628 B2* | 8/2022 | Miller | G06F 21/53 |
| 11,423,111 B2* | 8/2022 | Vaishnavi | G06F 16/953 |
| 11,431,697 B2* | 8/2022 | Parekh | H04L 63/08 |
| 11,502,908 B1* | 11/2022 | Singh | H04L 63/14 |
| 11,593,270 B1* | 2/2023 | Brooker | G06F 11/1092 |
| 11,611,497 B1* | 3/2023 | Manikanta | H04L 67/02 |
| 11,632,360 B1* | 4/2023 | Tan | G06F 3/0622 |
| | | | 726/4 |
| 11,726,846 B2* | 8/2023 | Bhatia | G06F 16/2379 |
| | | | 719/328 |
| 11,736,585 B2* | 8/2023 | Perng | H04L 67/133 |
| | | | 709/227 |
| 11,792,284 B1* | 10/2023 | Nanduri | G06F 9/542 |
| | | | 709/224 |
| 11,816,073 B1* | 11/2023 | Chakrabarti | G06F 16/184 |
| 11,831,516 B2* | 11/2023 | Li | H04L 41/18 |
| 11,895,192 B1* | 2/2024 | Mehta | H04L 67/565 |
| 11,909,750 B1* | 2/2024 | Morris | G06F 16/288 |
| 2003/0065805 A1* | 4/2003 | Barnes, Jr. | G06Q 30/0643 |
| | | | 709/244 |
| 2003/0163692 A1* | 8/2003 | Kleinsteiber | H04L 63/104 |
| | | | 713/169 |
| 2003/0163727 A1* | 8/2003 | Hammons | H04L 63/0823 |
| | | | 709/225 |
| 2009/0037492 A1* | 2/2009 | Baitalmal | G06F 16/27 |
| 2010/0103837 A1* | 4/2010 | Jungck | H04L 61/4511 |
| | | | 370/252 |
| 2010/0198730 A1* | 8/2010 | Ahmed | G06F 21/30 |
| | | | 380/278 |
| 2010/0250497 A1* | 9/2010 | Redlich | G06Q 10/06 |
| | | | 707/661 |
| 2010/0333116 A1* | 12/2010 | Prahlad | G06F 3/067 |
| | | | 713/153 |
| 2011/0225506 A1* | 9/2011 | Casalaina | H04L 41/5061 |
| | | | 715/744 |
| 2013/0058346 A1* | 3/2013 | Sridharan | H04L 45/586 |
| | | | 370/392 |
| 2013/0204849 A1* | 8/2013 | Chacko | G06F 3/0664 |
| | | | 707/692 |
| 2013/0322446 A1* | 12/2013 | Biswas | H04L 12/4633 |
| | | | 370/392 |
| 2014/0020068 A1* | 1/2014 | Desai | G06Q 20/3227 |
| | | | 726/4 |
| 2014/0068705 A1* | 3/2014 | Chambers | H04L 63/10 |
| | | | 726/1 |
| 2014/0108474 A1* | 4/2014 | David | H04L 67/568 |
| | | | 707/827 |
| 2014/0181285 A1* | 6/2014 | Stevens | H04L 41/0803 |
| | | | 709/223 |
| 2014/0189069 A1* | 7/2014 | Gero | H04L 67/566 |
| | | | 709/219 |
| 2014/0192804 A1* | 7/2014 | Ghanwani | H04L 61/103 |
| | | | 718/1 |
| 2015/0081863 A1* | 3/2015 | Garg | H04L 41/00 |
| | | | 709/223 |
| 2015/0163206 A1* | 6/2015 | McCarthy | G06F 21/6227 |
| | | | 726/4 |
| 2015/0195178 A1* | 7/2015 | Bhattacharya | H04L 41/342 |
| | | | 718/1 |
| 2015/0207758 A1* | 7/2015 | Mordani | H04L 67/10 |
| | | | 709/226 |
| 2015/0229645 A1* | 8/2015 | Keith | H04W 12/086 |
| | | | 726/4 |
| 2015/0310188 A1* | 10/2015 | Ford | H04L 63/101 |
| | | | 726/28 |
| 2015/0365370 A1* | 12/2015 | Gvildys | H04L 65/1104 |
| | | | 709/206 |
| 2015/0373097 A1* | 12/2015 | Konkus | H04L 67/1025 |
| | | | 709/203 |
| 2016/0092339 A1* | 3/2016 | Straub | G06F 9/44521 |
| | | | 717/124 |
| 2016/0127454 A1* | 5/2016 | Maheshwari | G06F 9/5072 |
| | | | 709/223 |
| 2017/0006135 A1* | 1/2017 | Siebel | G06Q 10/06 |
| 2017/0012872 A1* | 1/2017 | Chao | H04L 45/586 |
| 2017/0041296 A1* | 2/2017 | Ford | G06F 21/64 |
| 2017/0048319 A1* | 2/2017 | Straub | G06F 16/9574 |
| 2017/0078248 A1* | 3/2017 | Bian | H04L 63/20 |
| 2017/0126549 A1* | 5/2017 | Paramasivam | H04L 47/624 |
| 2017/0195217 A1* | 7/2017 | Parasmal | H04L 67/02 |
| 2017/0195237 A1* | 7/2017 | Parasmal | H04L 43/0876 |
| 2017/0331791 A1* | 11/2017 | Wardell | H04W 12/062 |
| 2017/0331832 A1* | 11/2017 | Lander | H04L 63/102 |
| 2017/0339148 A1* | 11/2017 | Syomichev | G06F 21/00 |
| 2017/0339247 A1* | 11/2017 | Tiwari | H04L 41/0895 |
| 2017/0364702 A1* | 12/2017 | Goldfarb | G06F 21/6218 |
| 2018/0041598 A1* | 2/2018 | Vats | H04L 63/104 |
| 2018/0063089 A1* | 3/2018 | Moysi | G06F 16/2456 |
| 2018/0063143 A1* | 3/2018 | Wilson | H04L 67/60 |
| 2018/0077144 A1* | 3/2018 | Gangawane | H04L 63/102 |
| 2018/0081983 A1* | 3/2018 | Carru | H04L 67/5682 |
| 2018/0083915 A1* | 3/2018 | Medam | G06F 16/2246 |
| 2018/0083944 A1* | 3/2018 | Vats | H04L 63/0815 |
| 2018/0083977 A1* | 3/2018 | Murugesan | G06F 3/0482 |
| 2018/0109498 A1* | 4/2018 | Singh | H04L 67/02 |
| 2018/0159856 A1* | 6/2018 | Gujarathi | H04L 63/0281 |
| 2018/0176301 A1* | 6/2018 | Rosier | H04L 67/1097 |
| 2018/0288063 A1* | 10/2018 | Koottayi | G06F 21/50 |
| 2018/0322136 A1* | 11/2018 | Carpentier | G06F 16/188 |
| 2018/0367363 A1* | 12/2018 | Jaeger | H04L 41/02 |
| 2018/0367396 A1* | 12/2018 | Kompella | H04L 41/0893 |
| 2018/0367541 A1* | 12/2018 | Ponnuswamy | H04L 63/101 |
| 2018/0375828 A1* | 12/2018 | Rawat | H04L 63/029 |
| 2019/0058709 A1* | 2/2019 | Kempf | G06F 21/64 |
| 2019/0075438 A1* | 3/2019 | Kuo | H04W 4/70 |
| 2019/0095491 A1* | 3/2019 | Bhattacharjee | G06F 16/2433 |
| 2019/0098106 A1* | 3/2019 | Mungel | H04L 67/564 |
| 2019/0102162 A1* | 4/2019 | Pitre | H04L 63/10 |
| 2019/0103991 A1* | 4/2019 | Cidon | H04L 45/04 |
| 2019/0103993 A1* | 4/2019 | Cidon | H04L 45/123 |
| 2019/0104035 A1* | 4/2019 | Cidon | H04M 15/51 |
| 2019/0104111 A1* | 4/2019 | Cidon | H04L 41/0895 |
| 2019/0104413 A1* | 4/2019 | Cidon | H04L 12/4625 |
| 2019/0116153 A1* | 4/2019 | Deverakonda Venkata | H04L 9/3268 |
| 2019/0138638 A1* | 5/2019 | Pal | G06F 16/285 |
| 2019/0147092 A1* | 5/2019 | Pal | H04L 67/125 |
| | | | 707/713 |
| 2019/0158605 A1* | 5/2019 | Markuze | H04L 69/163 |

(56) References Cited

U.S. PATENT DOCUMENTS

| | | | |
|---|---|---|---|
| 2019/0182213 A1* | 6/2019 | Saavedra | H04L 63/0218 |
| 2019/0268421 A1* | 8/2019 | Markuze | H04L 67/10 |
| 2019/0306010 A1* | 10/2019 | Medam | H04L 41/069 |
| 2019/0306111 A1* | 10/2019 | Tang | H04L 43/0864 |
| 2019/0306138 A1* | 10/2019 | Carru | H04L 63/10 |
| 2019/0312857 A1* | 10/2019 | Lander | G06F 9/5072 |
| 2019/0318122 A1* | 10/2019 | Hockey | G06Q 20/02 |
| 2019/0349426 A1* | 11/2019 | Smith | H04L 67/12 |
| 2019/0373083 A1* | 12/2019 | Nucci | H04L 63/062 |
| 2020/0007583 A1* | 1/2020 | Dixit | H04L 63/102 |
| 2020/0014763 A1* | 1/2020 | Boon | H04L 67/563 |
| 2020/0053129 A1* | 2/2020 | Neystadt | H04L 63/166 |
| 2020/0097583 A1* | 3/2020 | Fanghaenel | G06F 16/2291 |
| 2020/0133955 A1* | 4/2020 | Padmanabhan | G06Q 30/01 |
| 2020/0137065 A1* | 4/2020 | Tubbs | H04L 63/102 |
| 2020/0186501 A1* | 6/2020 | Neystadt | H04L 63/08 |
| 2020/0201935 A1* | 6/2020 | Filipovic | G06F 40/154 |
| 2020/0204551 A1* | 6/2020 | Singh | H04L 63/0218 |
| 2020/0236187 A1* | 7/2020 | Tal | H04L 63/0281 |
| 2020/0250295 A1* | 8/2020 | Padmanabhan | H04L 63/102 |
| 2020/0250683 A1* | 8/2020 | Padmanabhan | G06Q 20/38215 |
| 2020/0252404 A1* | 8/2020 | Padmanabhan | H04L 63/061 |
| 2020/0252406 A1* | 8/2020 | Padmanabhan | H04L 9/3271 |
| 2020/0257700 A1* | 8/2020 | Xu | G06F 16/213 |
| 2020/0272670 A1* | 8/2020 | Vaishnavi | G06F 9/541 |
| 2020/0274782 A1* | 8/2020 | Balaiah | H04L 67/10 |
| 2020/0304502 A1* | 9/2020 | Jafari | H04L 63/029 |
| 2020/0336484 A1* | 10/2020 | Mahajan | H04L 63/0884 |
| 2020/0344233 A1* | 10/2020 | Lai | G06Q 20/4014 |
| 2020/0374106 A1* | 11/2020 | Padmanabhan | H04L 9/0894 |
| 2020/0394332 A1* | 12/2020 | Jakobsson | G06F 16/24573 |
| 2020/0403994 A1* | 12/2020 | Bitterfeld | H04L 67/53 |
| 2020/0404059 A1* | 12/2020 | Feiguine | H04L 67/51 |
| 2021/0067461 A1* | 3/2021 | Cidon | H04L 41/0813 |
| 2021/0067468 A1* | 3/2021 | Cidon | H04L 45/38 |
| 2021/0075815 A1* | 3/2021 | dos Santos Silva | H04L 63/20 |
| 2021/0081947 A1* | 3/2021 | Hockey | G06F 21/45 |
| 2021/0105275 A1* | 4/2021 | Bansal | H04L 67/1001 |
| 2021/0168142 A1* | 6/2021 | Foxhoven | H04L 63/0884 |
| 2021/0176326 A1* | 6/2021 | Carley | G06F 9/546 |
| 2021/0182423 A1* | 6/2021 | Padmanabhan | H04L 9/3271 |
| 2021/0234860 A1* | 7/2021 | Bansal | H04W 12/37 |
| 2021/0286861 A1* | 9/2021 | Churchill | G06F 21/31 |
| 2021/0306436 A1* | 9/2021 | Magerramov | G06F 9/45558 |
| 2021/0336934 A1* | 10/2021 | Deshmukh | H04L 63/105 |
| 2021/0367944 A1* | 11/2021 | Gupta | H04L 67/56 |
| 2021/0377210 A1* | 12/2021 | Singh | H04L 67/51 |
| 2021/0409336 A1* | 12/2021 | Talur | H04L 67/564 |
| 2022/0019367 A1* | 1/2022 | Freilich | G06F 3/067 |
| 2022/0027431 A1* | 1/2022 | Zheng | H04L 41/142 |
| 2022/0029929 A1* | 1/2022 | Jain | H04L 47/803 |
| 2022/0094741 A1* | 3/2022 | Kothandaraman | H04L 69/28 |
| 2022/0141192 A1* | 5/2022 | Silveira | H04L 63/0823 726/15 |
| 2022/0141308 A1* | 5/2022 | Saha | H04L 63/0281 709/245 |
| 2022/0174491 A1* | 6/2022 | Cristache | G05D 1/0246 |
| 2022/0210063 A1* | 6/2022 | Brar | H04L 12/4633 |
| 2022/0224703 A1* | 7/2022 | Devarajan | H04L 63/0428 |
| 2022/0247657 A1* | 8/2022 | Kamath | H04L 67/148 |
| 2022/0266451 A1* | 8/2022 | Cristache | G05D 1/0297 |
| 2022/0286494 A1* | 9/2022 | Zheng | H04L 63/0281 |
| 2022/0321566 A1* | 10/2022 | Coyle | H04L 63/101 |
| 2022/0321567 A1* | 10/2022 | Klosterman | H04L 63/102 |
| 2022/0341217 A1* | 10/2022 | Cristache | G06Q 30/01 |
| 2022/0353339 A1* | 11/2022 | Singh | H04L 47/35 |
| 2022/0385656 A1* | 12/2022 | Gujarathi | H04L 63/0876 |
| 2022/0393943 A1* | 12/2022 | Pangeni | H04L 67/10 |
| 2023/0015603 A1* | 1/2023 | Smith | H04L 63/1433 |
| 2023/0019448 A1* | 1/2023 | Deshmukh | H04L 63/1433 |
| 2023/0020330 A1* | 1/2023 | Schwerin | G06F 16/256 |
| 2023/0031855 A1* | 2/2023 | Busbee | H04L 41/046 |
| 2023/0075355 A1* | 3/2023 | Twigg | H04L 67/306 |
| 2023/0079238 A1* | 3/2023 | Cristache | G06N 20/00 706/46 |
| 2023/0112401 A1* | 4/2023 | Cristache | B25J 9/08 701/22 |
| 2023/0169529 A1* | 6/2023 | Mukhitov | G06Q 30/0623 705/7.35 |
| 2023/0186870 A1* | 6/2023 | Cristache | H04W 12/68 345/204 |
| 2023/0206329 A1* | 6/2023 | Cella | G06Q 20/367 |
| 2023/0208943 A1* | 6/2023 | VanAntwerp | H04L 67/10 709/230 |
| 2023/0231884 A1* | 7/2023 | Deshmukh | H04L 63/1441 726/1 |
| 2023/0239234 A1* | 7/2023 | Zohar | H04L 45/123 370/389 |
| 2023/0247003 A1* | 8/2023 | Chanak | H04L 9/3226 726/1 |
| 2023/0262030 A1* | 8/2023 | Bansal | H04W 12/37 726/13 |
| 2023/0269137 A1* | 8/2023 | Fehring | H04L 67/1097 709/220 |
| 2023/0281527 A1* | 9/2023 | Cella | G06V 20/17 705/7.17 |
| 2023/0319054 A1* | 10/2023 | Hendrey | H04L 63/105 726/4 |
| 2023/0328086 A1* | 10/2023 | Kapoor | G06F 16/9535 |
| 2024/0080329 A1* | 3/2024 | Reed | H04L 67/306 |

OTHER PUBLICATIONS

Koponen et al "Network Virtualization in Multi-Tenant Datacenters," 11th USENIX Symposium on Networked Systems Design and Implementation, pp. 203-216, (Year: 2014).*

Chen et al "Collaborative Network Security in Multi-Tenant Data Center for Cloud Computing," Tsinghua Science and Technology, pp. 82-94 (Year: 2014).*

Factor et al "Secure Logical Isolation for Multi-Tenancy in Cloud Storage," IEEE, pp. 1-5 (Year: 2013).*

Sadeh et al "SignedQuery: Protecting Users Data in Multi-tenant SaaS Environments," IEEE, pp. 213-218, (Year: 2013).*

* cited by examiner

LOGGING ACCESS TYPES BASED ON INSERTING TENANT CONTROL HEADERS INTO REQUESTS

FIELD

Embodiments of the invention relate to the field of network communications, and more specifically, to using a proxy server configured to use tenant control headers to manage access requests for resources.

BACKGROUND

IT administrators are concerned with maintaining high security, performance, and reliability of their customer network (e.g., a corporate network). To prevent the loss of sensitive or confidential data from the corporate network, IT administrators can allow users to access applications using corporate accounts, while blocking access to the application using personal accounts.

SUMMARY

A networked system includes a proxy server configured to proxy requests and responses between client devices and cloud-based servers. The proxy server stores customer access policies that are applicable to resources requested by the client devices. When the proxy server receives a request, the proxy server determines a tenant identifier from the customer access policy, inserts a tenant control header with the tenant identifier in the request, and sends the modified request to the cloud-based server. The cloud-based server can then compare the tenant identifier in the tenant control header to a tenant identifier in the body of the request. In response to receiving a response from the cloud-based server indicating a rejection of the request, the proxy server transmits the request again to the cloud-based server but without the tenant control header. The proxy server then logs the request as an access request using a non-permitted tenant identifier.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A proxy server sits between user devices and the internet and intercepts any network traffic from the user devices. For example, a proxy server receives requests (e.g., HTTP requests) from the user devices that are transmitted by the proxy server on the user's behalf. The proxy server can then relay responses to the requests back to the user devices. Some cloud-based services facilitate a tenant control feature that allows a proxy server to prevent access to a resource if a known tenant (e.g., a customer-defined domain) is not used. To use this feature, the proxy server inserts a tenant control header into the request specifying the tenant that is to be allowed to access the requested resource. The cloud-based service will reject any requests that are not associated with the tenant indicated in the tenant control header. For example, the cloud-based service will block a request that includes account credentials with the domain "example.com" when a tenant identified in the tenant control header is "company.com."

However, blocking all requests with credentials that do not match the tenant identified in the tenant control header can be over-inclusive and result in a poor user experience. The embodiments described herein provide mechanisms for enforcing customer access policies in a manner that allows the proxy server to distinguish requests that include credentials for tenants allowed to access the requested resource from requests that do not.

In one embodiment, a proxy server receives a request from a user to access a resource hosted by a cloud-based server. The proxy server can insert a tenant control header into the request that specifies a tenant identifier (e.g., a domain name, directory identifier, etc.) that indicates a tenant that is permitted to access the resource. The proxy server then transmits the request with the inserted tenant control header to the cloud-based server. The cloud-based server can then compare the tenant identifier in the tenant control header to a tenant identifier in the body of the request. When they do not match, the cloud-based server rejects the request, and, conversely, when they do match, the cloud-based server accepts the request. In response to receiving a response from the cloud-based server indicating a rejection of the request, the proxy server transmits the request again to the cloud-based server but without the tenant control header. The proxy server then logs the request as an access request using a non-permitted tenant identifier.

Embodiments of the invention provide many technical advantages, in addition to addressing the deficiencies of previous solutions. For example, improvements to the security of resources can be realized by using the tenant control header to differentiate between requests that use account credentials with a permitted tenant identifier from requests that use account credentials without a permitted tenant identifier.

Figure 1:
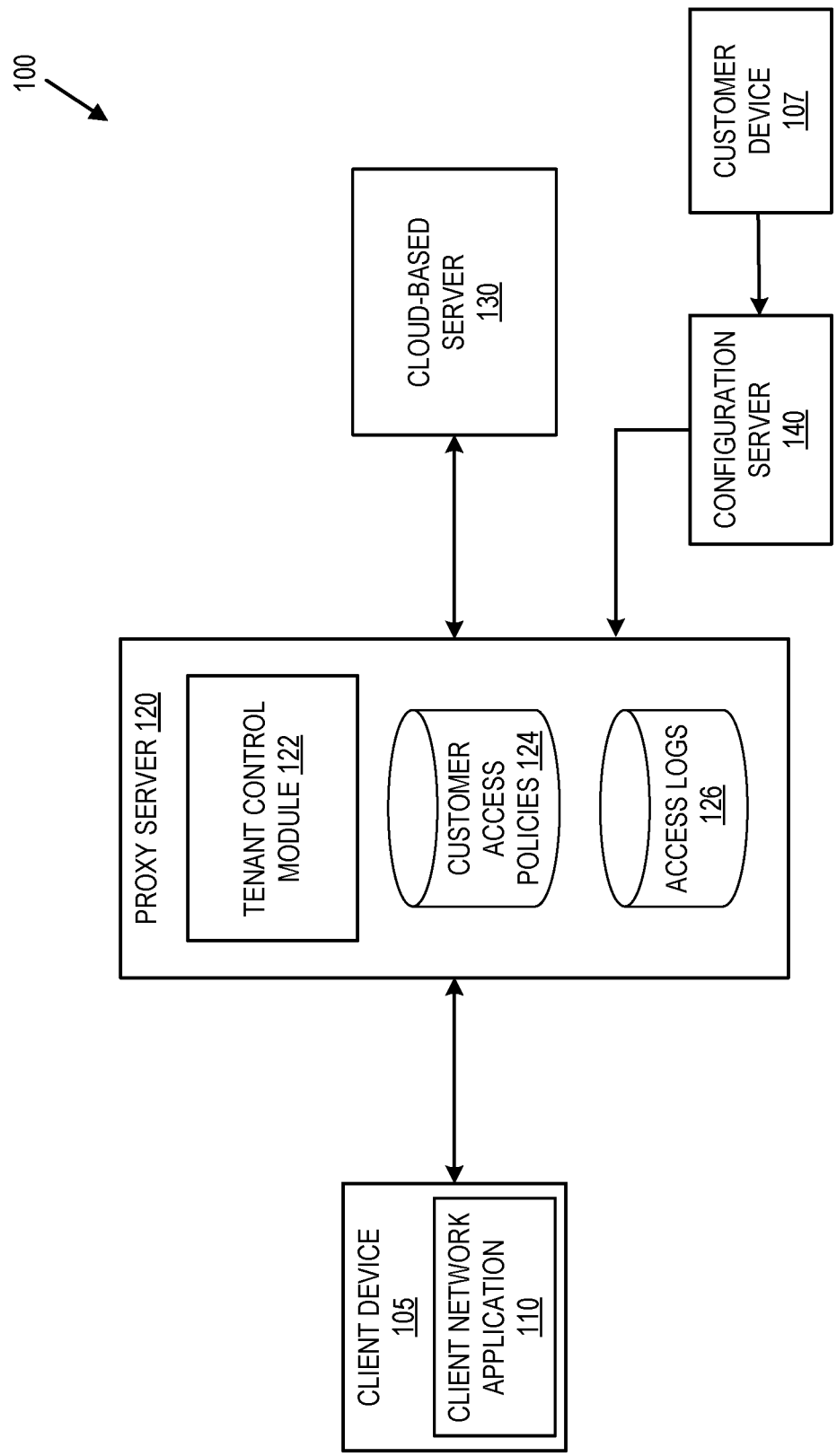
FIG. 1 illustrates an exemplary networked system according to some embodiments described herein.

FIG. 1 illustrates an exemplary networked system according to some embodiments described herein. The exemplary networked system 100 illustrated in FIG. 1 includes a proxy server 120 situated between a client device 105 and a cloud-based server 130. The exemplary networked system 100 also includes a configuration server 140 that is connected to and/or in communication with the proxy server 120. The embodiment depicted in FIG. 1 illustrates operations for handling requests from the client device 105 to access resources hosted by the cloud-based server 130, where the resources may have access policies defined by a customer via a customer device 107 in communication with the configuration server 140.

Examples of client device 105 include computing devices (e.g., laptops, desktops, workstations, smartphones, palm tops, mobile phones, tablets, gaming systems, set top boxes, wearable devices, internet-of-things (IoT) devices, electronic devices, etc.) that are capable of transmitting and/or receiving network traffic. In some embodiments, client device 105 executes a client network application 110 that is capable of transmitting and/or receiving network traffic. For example, client network applications 110 may be a web browser or other application that can access network resources (e.g., web pages, images, word processing documents, PDF files, movie files, music files, or other computer files).

In one embodiment, proxy server 120 is an intermediary device configured to receive requests to access and/or modify resources hosted by the cloud-based server 130, and further receives responses to such requests from the cloud-based server 130. For example, web traffic (e.g., HTTP requests/responses, HTTPS requests/responses, SPDY requests/responses, HTTP/2 requests, responses, etc.) for domains handled by cloud-based server 130 may be received at proxy server 120.

In some embodiments, the proxy server 120 includes a tenant control module 122 and a plurality of databases, including a customer access policies database 124 and an access logs database 126. The customer access policies database 124 stores access policies provided by a customer associated with a resource. The customer access policies database 124 can receive the access policies from a customer device 107, either directly or via the configuration server 140. The access logs database 126 stores access log data associated with requests to access resources hosted by the cloud-based server. In one embodiment, the access log data for a request indicates whether the request was received with account credentials associated with a permitted or a non-permitted tenant (e.g., domain).

In some embodiments, the tenant control module 122 is configured to generate tenant control headers that can be inserted or appended to requests received by the proxy server 120. The tenant control module 122 can generate the tenant control header based on customer access policies that allow a customer to define who can access a resource. The tenant control header can include a tenant identifier. Example tenant identifiers can include a domain (e.g., "example.com") or a directory identifier value that identifies a tenant. The insertion of the tenant control header into the request can result in the granting of access to the resource if the request includes credentials for a tenant matching a tenant identifier in the tenant control header. Conversely, access to the resource can be denied if the request includes credentials for a tenant that does not match a tenant identifier in the tenant control header.

Examples of cloud-based server 130 includes computing devices that may serve and/or generate network resources (e.g., web pages, images, word processing documents, PDF files, movie files, music files, or other computer files). Cloud-based server 130 may also be an edge server to the server that serves and/or generates network resources. Although not illustrated in FIG. 1, it should be understood that the network resources of cloud-based server 130 may be stored separately from the device that responds to the requests.

Examples of customer device 107 include computing devices (e.g., laptops, desktops, workstations, smartphones, palm tops, mobile phones, tablets, gaming systems, set top boxes, wearable devices, internet-of-things (IoT) devices, electronic devices, etc.) that are capable of managing resources associated with the customer, including through the creation of customer access policies for such resources. In one embodiment, the configuration server 140 receives configuration data from the customer device 107. In one embodiment, the configuration server 140 allows a user of the customer device 107 to provide the configuration data to configure settings and parameters for access policies that apply to resources hosted by the cloud-based server 130.

Figure 2:
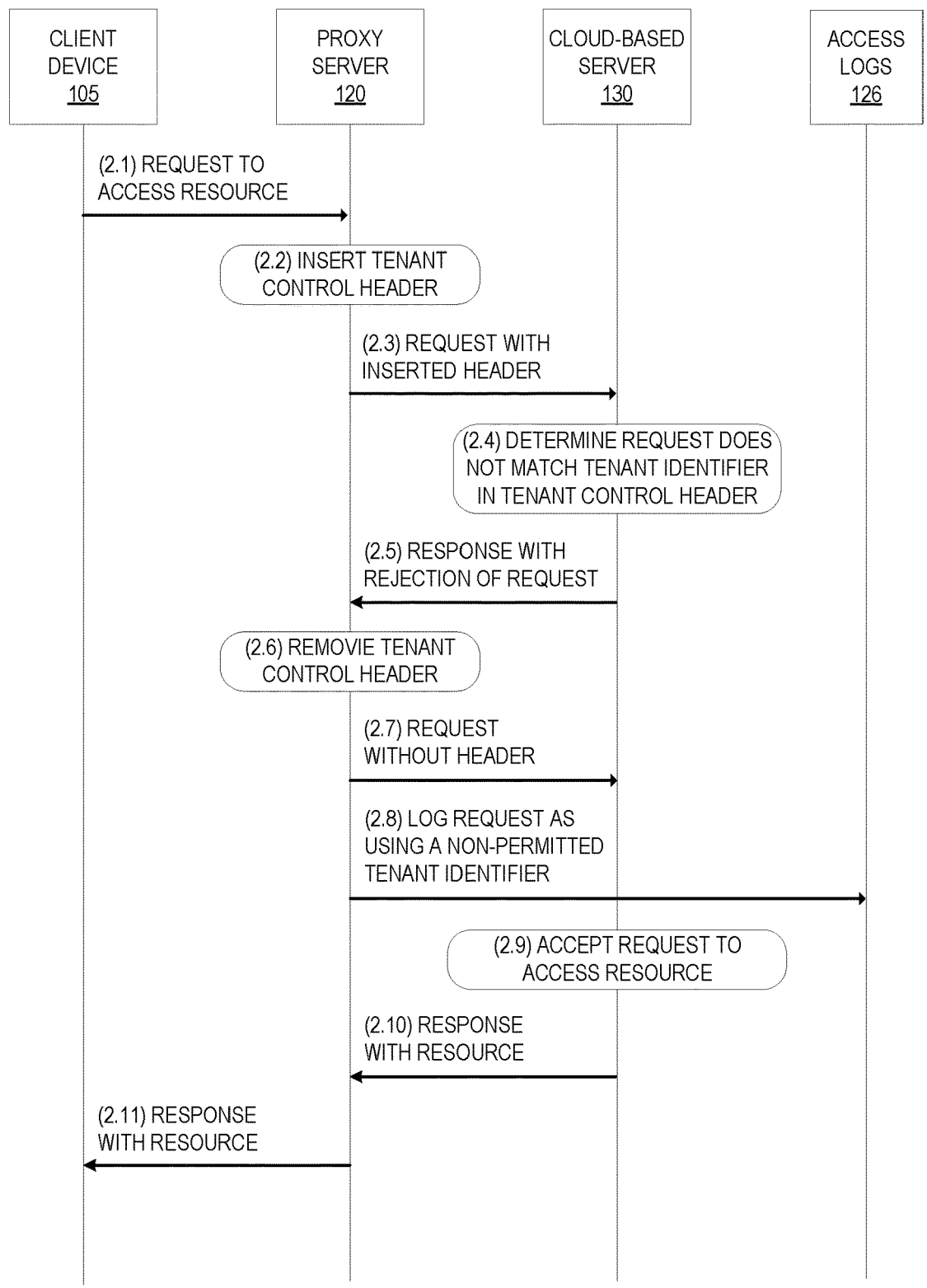
FIG. 2 illustrates a sequence diagram including operations performed by a proxy server enforcing customer access policies on requests for resources according to an embodiment.

FIG. 2 illustrates a sequence diagram including operations performed by a proxy server enforcing customer access policies on requests for resources according to an embodiment.

At operation 2.1, client device 105 makes a request to access a resource that is received at proxy server 120. For example, the request can be made by a client network application (e.g., client network application 110) operating on the client device 105. The request can be generated in response to a user selecting a link or URL (e.g., in a browser application). For example, proxy server 120 receives an HTTP "GET" request to access a resource hosted by cloud-based server 130. In one embodiment, the requested resource is a web page (e.g., an HTML page) located at, e.g., www.example.com/index.html. The request may include a request for an action to be performed on the resource. The request may include credentials for accessing the resource, including a user name, an email address, etc.

At operation 2.2, the proxy server 120 modifies the request by inserting a tenant control header. In some embodiments, the proxy server includes a tenant control module 122 that is configured to generate the tenant control header that is inserted into, or appended to, the request from the client device 105. In one embodiment, the tenant control module 122 accesses a customer access policies database 124 using an identifier of the resource requested (e.g., an application name, etc.) to retrieve associated policies defined by a customer.

In some embodiments, a customer access policy for a resource may indicate that permitted requests should include a specific tenant identifier. An example tenant identifier is a domain associated with the customer. For example, when a customer access policy for a resource indicates that credentials in the request should include the tenant identifier "company.com," the tenant control module 122 generates a tenant control header that includes the domain "company.com."

At operation 2.3, after modifying the request to include the tenant control header, the proxy server 120 sends the modified request to the cloud-based server 130 hosting the resource. The cloud-based server 130 is configured to decrypt the request and identify account credentials in the request. For example, the cloud-based server 130 identifies a username or email address in the request. The cloud-based server 130 is further configured to extract the tenant identifier from the tenant control header. The cloud-based server 130 then compares the domain of the account credentials with the domain indicated by the tenant identifier from the tenant control header.

At operation 2.4, when the domain of the account credentials and the domain indicated by the tenant identifier from the tenant control header do not match, the cloud-based server 130 determines that the account credentials in the request are not permitted access to the resource. For example, if the tenant identifier from the tenant control header indicates that credentials with the domain "company.com" are permitted and the account credentials in request have the domain "email.com," the cloud-based server rejects the request.

At operation 2.5, in response to determining that the domain in the account credentials do not match the domain from the tenant control header, the cloud-based server 130 sends a response indicating the rejection of the request to the proxy server 120. In some embodiments, the response can include an HTTP status response, such as a "4xx client error" response indicating that the request cannot be fulfilled. Example responses can include a "401 Unauthorized" or a "403 Forbidden" HTTP client error code.

In some embodiments, the response from the cloud-based server 130 can be a webpage. In such embodiments, the proxy server 120 can be configured to analyze the content of the webpage to determine whether the request failed. For example, the proxy server 120 can identify keywords or phrases from the content of the webpage (e.g., an error code).

In some embodiments, the proxy server 120 can fingerprint known success responses, e.g., via status codes, keywords/phrases, expected redirects, etc. In such embodiments, when the proxy server 120 receives the response from the cloud-based server 130, the proxy server 120 can compare the response to the fingerprinted known success responses. When the response from the cloud-based server 130 differs from the known success responses, the proxy server 120 can identify the response as indicating that the request failed.

At operation 2.6, the proxy server 120 removes the tenant control header from the modified request. Upon receipt of the rejection response, the proxy server 120 recognizes the rejection of the request with the tenant control header as indicating that the request included credentials with a domain other than a permitted domain. Instead of blocking, or dropping, the request, however, the proxy server 120 is configured to remove the tenant control header from the modified request. In some embodiments, the proxy server 120 can retrieve the original request that was stored without the tenant control header (e.g., from storage).

In another embodiment, the proxy server 120 can generate a failure notification message and transmit the failure notification message back to the client device 105 that initiated the request to access the resource (in operation 2.1). In such embodiments, the failure notification message can be an indication to the client device to retransmit the request to access the resource to the proxy server 120.

In some embodiments, the failure notification message include a rate-limit status code (e.g., "429 Too Many Requests.") or include a "retry-after" HTTP header. In some embodiments, the proxy server 120 can return a client-specific response. For example, the response back to the client device 105 can include a 429 error code or a retry-after HTTP header based on client support. In some embodiments, the proxy server 120 can fingerprint and identify the client device 105 to determine which method(s) are supported by the client device 105. In situations where the client device 105 does not support either a rate-limit status code or a "retry-after" HTTP header, the proxy server 120 can retransmit the request on behalf of the client device 105 (e.g., by retrieving a stored copy of the original request).

At operation 2.7, after retrieving the original request, receiving a retransmitted request, or modifying the request to remove the tenant control header, the proxy server 120 resends the request, or forwards as-is the retransmitted request, without the tenant control header to the cloud-based server 130.

At operation 2.8, the proxy server 120 logs the request received from the client device 105 as using a non-permitted tenant identifier. The rejection of the modified request with the tenant control header is an indication that the initial request from the client device 105 did not have account credentials matching the tenant identifier indicated in the tenant control header. In embodiments, the proxy server 120 can generate and store the log entry in a database (e.g., access logs database 126) prior to, simultaneously with, or subsequent to sending the request without the tenant control header to the cloud-based server 130.

At operation 2.9, the cloud-based server 130 decrypts the received request without the tenant control header and accepts the request to access the resource. At operation 2.10, in response to accepting the request to access the resource, the cloud-based server 130 sends a response with the requested resource to the proxy server 120. For example, the cloud-based server 130 can retrieve the requested resource and/or grant access to the requested resource. The cloud-based server 130 can then generate a response with the resource and send the response to the proxy server 120. At operation 2.11, the proxy server 120 can send the response with the resource to the client device 105.

Figure 3:
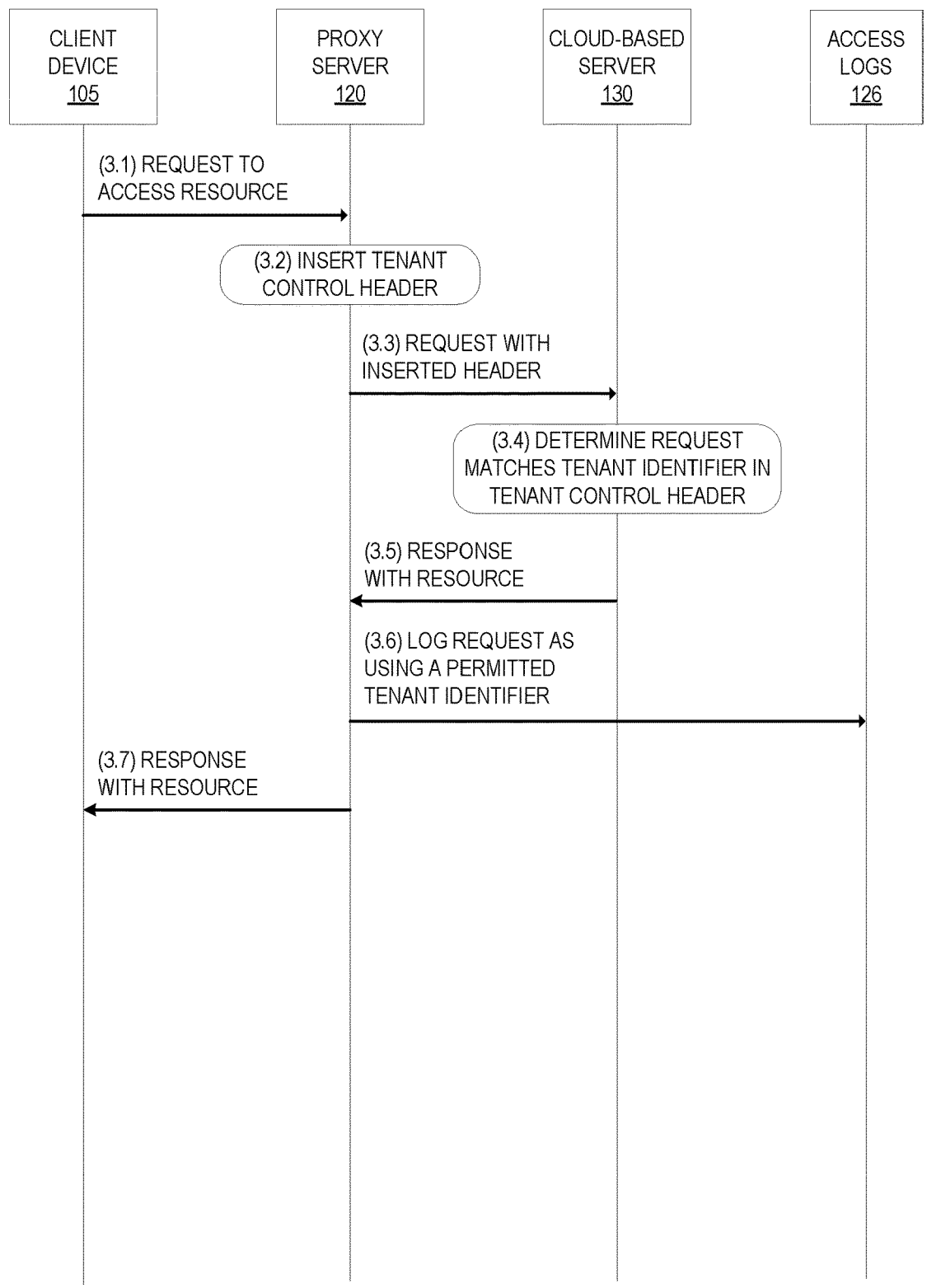
FIG. 3 illustrates a sequence diagram including operations performed by a proxy server enforcing customer access policies on requests for resources according to an embodiment.

FIG. 3 illustrates a sequence diagram including operations performed by a proxy server enforcing customer access policies on requests for resources according to an embodiment.

At operation 3.1, client device 105 makes a request to access a resource that is received at proxy server 120. For example, the request can be made by a client network application (e.g., client network application 110) operating on the client device 105. The request can be generated in response to a user selecting a link or URL (e.g., in a browser application). For example, proxy server 120 receives an HTTP "GET" request to access a resource hosted by cloud-based server 130. In one embodiment, the requested resource is a web page (e.g., an HTML page) located at, e.g., www.example.com/index.html. The request may include a request for an action to be performed on the resource. The request may include credentials for accessing the resource, including a user name, an email address, etc.

At operation 3.2, the proxy server 120 modifies the request by inserting a tenant control header. In some embodiments, the proxy server includes a tenant control module 122 that is configured to generate the tenant control header that is inserted into, or appended to, the request from the client device 105. In one embodiment, the tenant control module 122 accesses a customer access policies database 124 using an identifier of the resource requested (e.g., an application name, etc.) to retrieve associated policies defined by a customer.

In some embodiments, a customer access policy for a resource may indicate that permitted requests should include a specific tenant identifier. An example tenant identifier is a domain associated with the customer. For example, when a customer access policy for a resource indicates that credentials in the request should include the tenant identifier "company.com," the tenant control module 122 generates a tenant control header that includes the domain "company.com."

At operation 3.3, after modifying the request to include the tenant control header, the proxy server 120 sends the modified request to the cloud-based server 130 hosting the resource. The cloud-based server 130 is configured to decrypt the request and identify account credentials in the request. For example, the cloud-based server 130 identifies a username or email address in the request. The cloud-based server 130 is further configured to extract the tenant identifier from the tenant control header. The cloud-based server 130 then compares the domain of the account credentials with the domain indicated by the tenant identifier from the tenant control header.

At operation 3.4, when the domain of the account credentials and the domain indicated by the tenant identifier from the tenant control header match, the cloud-based server 130 determines that the account credentials in the request are permitted access to the resource. For example, if the tenant identifier from the tenant control header indicates that credentials with the domain "company.com" are permitted and the account credentials in request have the domain "company.com," the cloud-based server accepts or approves the request for the resource.

At operation 3.5, in response to determining that the domain in the account credentials matches the domain from the tenant control header, the cloud-based server 130 sends a response with the requested resource to the proxy server 120. For example, the cloud-based server 130 can retrieve the requested resource and/or grant access to the requested resource. The cloud-based server 130 can then generate a response with the resource and send the response to the proxy server 120.

At operation 3.6, the proxy server 120 logs the access request received from the client device 105 as using a permitted tenant identifier. The acceptance of the modified request with the tenant control header, as shown by the cloud-based server 130 sending the response with the resource, is an indication that the initial request from the client device 105 used account credentials matching the tenant identifier indicated in the tenant control header. In embodiments, the proxy server 120 can generate and store the log entry in a database (e.g., access logs database 126) prior to, simultaneously with, or subsequent to sending the response with the resource to the client device. At operation 3.7, the proxy server 120 can send the response with the resource to the client device 105.

Figure 4:
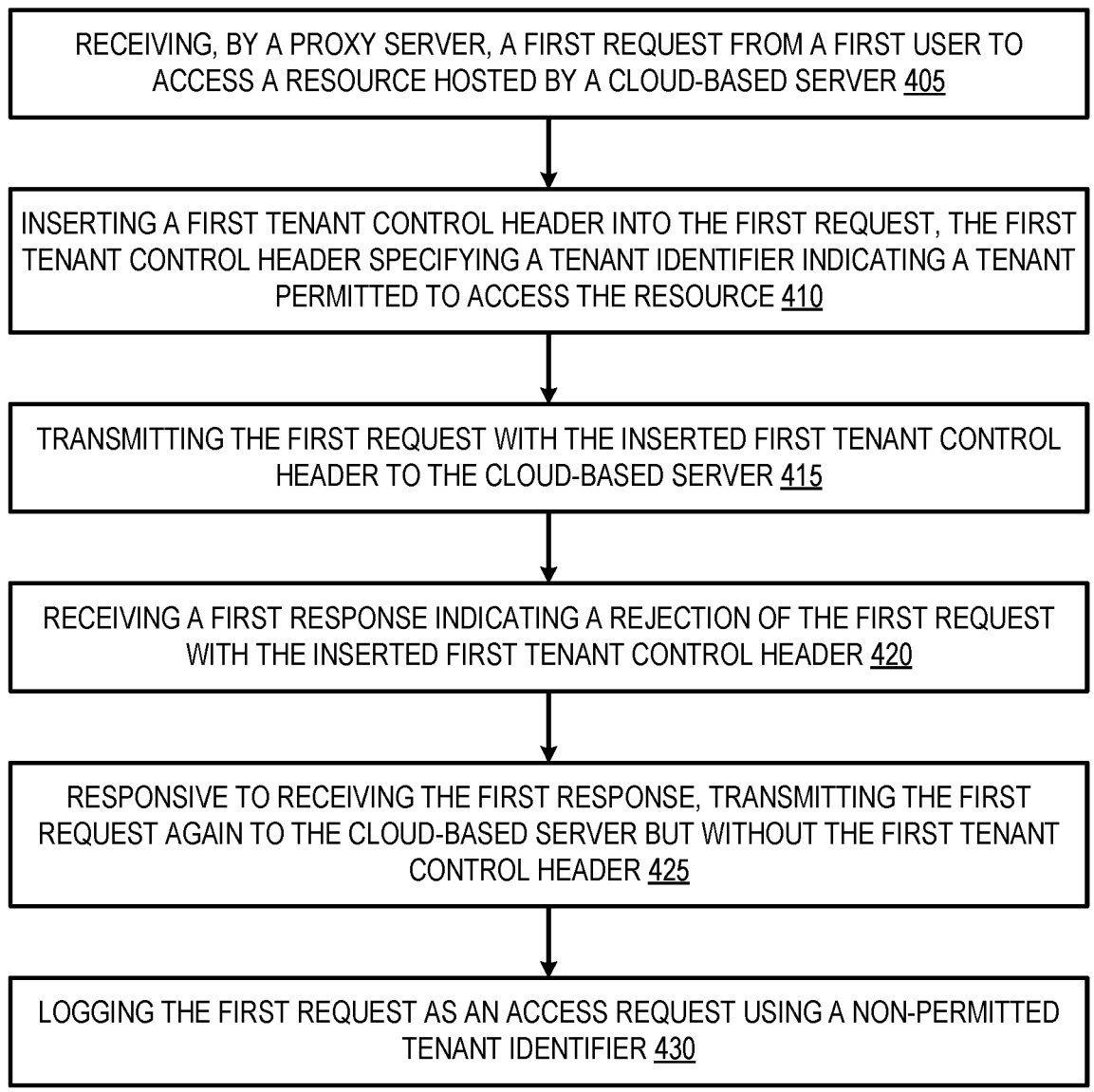
FIG. 4 is a flow diagram that illustrates exemplary operations for enforcing access policies on requests to access resources by a proxy server according to an embodiment.

FIG. 4 is a flow diagram that illustrates exemplary operations for enforcing access policies on requests to access resources by a proxy server according to an embodiment. The operations of FIG. 4 will be described with reference to the exemplary embodiment of FIG. 1. However, it should be understood that the operations of FIG. 4 can be performed by embodiments of the invention other than those discussed with reference to FIG. 1, and the embodiments discussed with reference to FIG. 1 can perform operations different than those discussed with reference to FIG. 4. The operations of FIG. 4 are described as being performed by a proxy server (e.g., proxy server 120).

In operation 405, a proxy server receives a first request from a first user to access a resource hosted by a cloud-based server. For example, the request can be made by the first user using a client network application operating on a client device. The request can be generated in response to a user selecting a link or URL (e.g., in a browser application). For example, the proxy server can receive an HTTP "GET" request to access a resource hosted by the cloud-based server. In one embodiment, the requested resource is a web page (e.g., an HTML page) located at, e.g., www.example.com/index.html. The request may include a request for an action to be performed on the resource. The request may include user credentials for accessing the resource, including a user name, an email address, etc.

In operation 410, the proxy server inserts a first tenant control header into the first request, the first tenant control header specifying a tenant identifier, the tenant identifier indicating a tenant permitted to access the resource. In some embodiments, the proxy server accesses a customer access policies database to retrieve a customer access policy associated with the resource. The proxy server then identifies a tenant identifier from the customer access policy. In one embodiment, the tenant identifier identifies a tenant that is permitted to access the resource. In such embodiments, the tenant identifier can be a domain (e.g., "example.com") or a directory identifier value. For example, the tenant identifier can be a domain associated with an organization or corporate system indicating that account credentials with the domain of the organization are allowed to access the resource. The proxy server generates the first tenant control header with the tenant identifier. The proxy server then inserts or appends the tenant control header to the first request.

In operation 415, the proxy server transmits the first request with the inserted first tenant control header to the cloud-based server. The cloud-based server is configured to decrypt the first request. The cloud-based server can extract or identify account credentials from the first request and compare the account credentials to the tenant identifier in the tenant control header of the first request. The cloud-based server may then accept or reject the first request based on the comparison. When the tenant identifier indicated by the account credentials in the first request does not match the tenant identifier in the tenant control header, the cloud-based server may reject the request.

In operation 420, the proxy server receives a first response indicating a rejection of the first request with the inserted first tenant control header. The rejection by the cloud-based server can be an indication to the proxy server that the first request used account credentials that did not match the tenant identifier from the customer access policy associated with the resource. This can be an indication that the account credentials were from a personal account (e.g., "email.com") instead of from the tenant indicated by the tenant identifier (e.g., "company.com").

In some embodiments, the rejection is indicated by the inclusion of an HTTP client error code in the first response. Examples of HTTP client error codes can include a "401 Unauthorized" or a "403 Forbidden" HTTP client error code. In other embodiments, the response from the cloud-based server can be a webpage. In such embodiments, the proxy server can be configured to analyze the content of the webpage to determine whether the request failed. For example, the proxy server can identify keywords or phrases from the content of the webpage (e.g., an error code) to determine whether the first request failed. In some embodiments, the proxy server can fingerprint known success responses, e.g., via status codes, keywords/phrases, expected redirects, etc. In such embodiments, the response can be compared with fingerprinted known success responses. When the response from the cloud-based server differs from the known success responses, the proxy server can identify the response as indicating that the request failed.

The failure notification message can include a rate-limit status code (e.g., "429 Too Many Requests.") or include a "retry-after" HTTP header. In some embodiments, the proxy server 120 can return a client-specific response. For example, the response back to the client device 105 can include a 429 error code or a retry-after HTTP header based on client support. In some embodiments, the proxy server 120 can fingerprint and identify the client device 105 to determine which method(s) are supported by the client device 105. In situations where the client device 105 does not support either a rate-limit status code or a "retry-after" HTTP header, the proxy server 120 can retransmit the request on behalf of the client device 105 (e.g., by retrieving a stored copy of the original request).

In operation 425, the proxy server, responsive to receiving the first response, transmits the first request again to the cloud-based server but without the first tenant control header. In one embodiment, the proxy server removes the tenant control header that was inserted in the first request in operation 415. In other embodiments, the proxy server retrieves an original copy of the first request for retransmission to the cloud-based server. In other embodiments, where the proxy server does not store a copy of the first request, the proxy server sends a failure notification to the client device that initiated the first request. In some embodiments, the failure notification message includes a rate-limit status code (e.g., "429 Too Many Requests.") or include a "retry-after" HTTP header. In some embodiments, the proxy server can fingerprint and identify the client device to determine which method(s) are supported by the client device, and then configure a failure notification message accordingly. For example, the failure notification message can be configured to include the rate-limit status code or the "retry-after" HTTP header based on the capabilities of the client device. In such embodiments, the client device can retransmit the request to the proxy server, and the proxy server can retransmit the request to the cloud-based server. Where the client device does not support either a rate-limit status code or a "retry-after" HTTP header, the proxy server can retransmit the request on behalf of the client device (e.g., by retrieving a stored copy of the original request).

In operation 430, the proxy server logs the first request as an access request using a non-permitted tenant identifier. In response to receiving the rejection of the first request with the tenant control header, the proxy server can log the first request as being from an unsanctioned account.

In one embodiment, when the tenant identifier indicated by the account credentials in a request (e.g., a second request) matches the tenant identifier in the tenant control header inserted or appended to the second request, the cloud-based server may accept the request. In such embodiments, responsive to accepting the request, the cloud-based server can send a second response to the proxy server. The second response can include the requested resource and can be proxied to a requesting client device via the proxy server. In such embodiments, the proxy server further logs the second request in an access logs database as a request that used a permitted tenant identifier.

Figure 5:
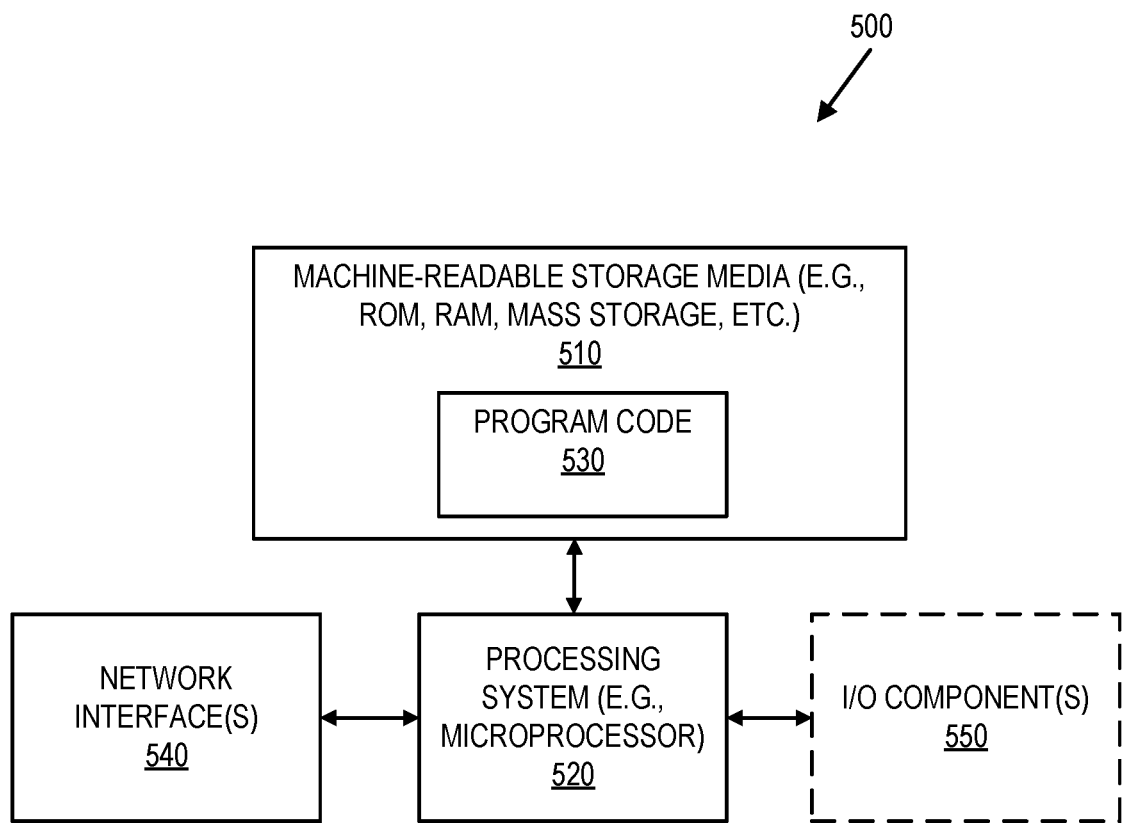
FIG. 5 illustrates a block diagram for an exemplary data processing system that can be used in some embodiments.

FIG. 5 illustrates a block diagram for an exemplary data processing system 500 that may be used in some embodiments. One or more such data processing systems 500 may be used to implement the embodiments and operations described with respect to the data centers, origin server, control server, or other electronic devices. The data processing system 500 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 520 (e.g., one or more processors and connected system components such as multiple connected chips). For example, the depicted machine-readable storage media 510 may store program code 530 that, when executed by the processing system 520, causes the data processing system 500 to perform any of the operations described herein.

The data processing system 500 also includes one or more network interfaces 540 (e.g., a wired and/or wireless interfaces) that allows the data processing system 500 to transmit data and receive data from other computing devices, typically across one or more networks (e.g., Local Area Networks (LANs), the Internet, etc.). The data processing system 500 may also include one or more input or output ("I/O") components 550 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices.

Additional components, not shown, may also be part of the data processing system 500, and, in certain embodiments, fewer components than that shown in FIG. 5 may also be used in a data processing system 500. One or more buses may be used to interconnect the various components shown in FIG. 5.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method comprising:
    receiving, by a proxy server, a first request from a first user to access a resource hosted by a cloud-based server;
    inserting a first tenant control header into the first request, the first tenant control header specifying a tenant identifier, the tenant identifier indicating a tenant permitted to access the resource;
    transmitting the first request with the inserted first tenant control header to the cloud-based server;
    receiving a first response indicating a rejection of the first request with the inserted first tenant control header, the first response including an HTTP client error code;
    responsive to receiving the first response indicating the rejection of the first request with the inserted first tenant control header, removing the first tenant control header from the first request;
    transmitting the first request again to the cloud-based server but without the first tenant control header; and
    logging the first request as an access request using a non-permitted tenant identifier.

2. The computer-implemented method of claim 1, further comprising:
    receiving, by the proxy server, a second request from a second user to access the resource hosted by the cloud-based server;
    inserting a second tenant control header into the second request, the second tenant control header specifying the tenant identifier;
    transmitting the second request with the inserted second tenant control header to the cloud-based server;
    receiving a second response indicating an acceptance of the second request with the inserted second tenant control header; and
    logging the second request as an access request using a permitted tenant identifier.

3. The computer-implemented method of claim 1, wherein the rejection of the first request with the inserted first tenant control header indicates a tenant identifier in the first request did not match the tenant identifier in the first tenant control header.

4. The computer-implemented method of claim 1, further comprising:
    receiving, from a customer device, configuration data including parameters for access policies for resources, the parameters including the tenant identifier indicating the tenant permitted to access the resource;
    generating a customer access policy for the resource based on the received configuration data; and
    storing the customer access policy in a policies database.

5. The computer-implemented method of claim 4, wherein inserting the first tenant control header into the first request comprises:
    retrieving the customer access policy from the policies database;
    identifying the tenant identifier from the customer access policy; and
    generating the first tenant control header with the tenant identifier.

6. The computer-implemented method of claim 1, wherein the tenant identifier is one of a domain and a directory identifier value.

7. A non-transitory machine-readable storage medium that provides instructions that, if executed by a processor, will cause said processor to perform operations comprising, comprising:
    receiving, by a proxy server, a first request from a first user to access a resource hosted by a cloud-based server;
    inserting a first tenant control header into the first request, the first tenant control header specifying a tenant identifier, the tenant identifier indicating a tenant permitted to access the resource;
    transmitting the first request with the inserted first tenant control header to the cloud-based server;
    receiving a first response indicating a rejection of the first request with the inserted first tenant control header, the first response including an HTTP client error code;
    responsive to receiving the first response indicating the rejection of the first request with the inserted first tenant control header, removing the first tenant control header from the first request;
    transmitting the first request again to the cloud-based server but without the first tenant control header; and
    logging the first request as an access request using a non-permitted tenant identifier.

8. The non-transitory machine-readable storage medium of claim 7, wherein the operations further comprise:
    receiving, by the proxy server, a second request from a second user to access the resource hosted by the cloud-based server;

inserting a second tenant control header into the second request, the second tenant control header specifying the tenant identifier;

transmitting the second request with the inserted second tenant control header to the cloud-based server;

receiving a second response indicating an acceptance of the second request with the inserted second tenant control header; and logging the second request as an access request using a permitted tenant identifier.

9. The non-transitory machine-readable storage medium of claim 7, wherein the rejection of the first request with the inserted first tenant control header indicates a tenant identifier in the first request did not match the tenant identifier in the first tenant control header.

10. The non-transitory machine-readable storage medium of claim 7, wherein the operations further comprise:

receiving, from a customer device, configuration data including parameters for access policies for resources, the parameters including the tenant identifier indicating the tenant permitted to access the resource;

generating a customer access policy for the resource based on the received configuration data; and storing the customer access policy in a policies database.

11. The non-transitory machine-readable storage medium of claim 10, wherein inserting the first tenant control header into the first request comprises:

retrieving the customer access policy from the policies database;

identifying the tenant identifier from the customer access policy; and generating the first tenant control header with the tenant identifier.

12. The non-transitory machine-readable storage medium of claim 7, wherein the tenant identifier is one of a domain and a directory identifier value.

13. A server, comprising:

a processor; and a non-transitory machine-readable storage medium that provides instructions that, if executed by the processor, will cause the server to perform operations including:

receiving a first request from a first user to access a resource hosted by a cloud-based server;

inserting a first tenant control header into the first request, the first tenant control header specifying a tenant identifier, the tenant identifier indicating a tenant permitted to access the resource;

transmitting the first request with the inserted first tenant control header to the cloud-based server;

receiving a first response indicating a rejection of the first request with the inserted first tenant control header, the first response including an HTTP client error code;

responsive to receiving the first response indicating the rejection of the first request with the inserted first tenant control header, removing the first tenant control header from the first request;

transmitting the first request again to the cloud-based server but without the first tenant control header; and logging the first request as an access request using a non-permitted tenant identifier.

14. The server of claim 13, wherein the operations further comprise:

receiving a second request from a second user to access the resource hosted by the cloud-based server;

inserting a second tenant control header into the second request, the second tenant control header specifying the tenant identifier;

transmitting the second request with the inserted second tenant control header to the cloud-based server;

receiving a second response indicating an acceptance of the second request with the inserted second tenant control header; and logging the second request as an access request using a permitted tenant identifier.

15. The server of claim 13, wherein the rejection of the first request with the inserted first tenant control header indicates a tenant identifier in the first request did not match the tenant identifier in the first tenant control header.

16. The server of claim 13, wherein the operations further comprise:

receiving, from a customer device, configuration data including parameters for access policies for resources, the parameters including the tenant identifier indicating the tenant permitted to access the resource;

generating a customer access policy for the resource based on the received configuration data; and storing the customer access policy in a policies database.

17. The server of claim 16, wherein inserting the first tenant control header into the first request comprises:

retrieving the customer access policy from the policies database;

identifying the tenant identifier from the customer access policy; and generating the first tenant control header with the tenant identifier.

18. The server of claim 13, wherein the tenant identifier is one of a domain and a directory identifier value.

* * * * *